Patented Dec. 6, 1932

1,890,373

UNITED STATES PATENT OFFICE

SIGMUND FRAENKEL, OF VIENNA, AUSTRIA, ASSIGNOR TO FIRM OF SOCIETY OF CHEMICAL INDUSTRY IN BASLE, OF BASEL, SWITZERLAND

HORMONE AND THE PROCESS OF OBTAINING SAME

No Drawing. Application filed June 7, 1928, Serial No. 283,741, and in Germany June 27, 1927.

This invention relates to a pure hormone from female internal secretory organs. It comprises the pure hormone itself and the process for its manufacture.

There is already known a number of processes for making from female internal secretory organs physiologically active substances in more or less highly purified form, but even the purest of them, notwithstanding their apparently constant composition and their well defined chemical and physical properties, cannot be regarded with certainty as chemical individuals.

This invention relates to a process whereby a hormone is isolated from female internal secretory organs in the form of a chemically pure well-defined compound.

As parent materials for the invention there are used extracts of the organs which have been subjected to a preliminary purification in known manner by eliminating from the extract the phosphatides, cholesterin, cholesterin esters, fats, and free fatty acids; the free fatty acids are preferably precipitated by treatment with a salt of a heavy metal or of an alkaline earth the treatment occurring in an organic solvent in which the metal soaps produced are insoluble. Advantageously a neutral or feebly ammoniacal solution of lead acetate or an acetate of an alkaline earth in methyl alcohol is used as the agent for precipitating fatty acids.

The process according to the invention consists in dissolving in petroleum ether the preliminarily purified extract freed as far as possible from metal soaps and excess of metal salt used for precipitating the fatty acids, and from the solvent, and eliminating from the petroleum ether solution the residual metal soaps of unsaturated fatty acids, which are soluble in petroleum ether, by treating the solution with a solution of a neutral electrolyte the anions and kations of which form with the metal kations (for example lead) and the unsaturated fatty acid anions respectively of the soaps salts which are insoluble in petroleum ether, for instance, with a solution of potassium sulfate, sodium sulfate or silver nitrate.

The hormone which is thus obtained in highly concentrated form, can then be subjected to a further purification as follows:—

Instead of lead acetate an acetate of an alkaline earth may be used.

If desired the active substance may finally be purified as follows:—

The solution of the hormone is concentrated in a suitable absolute solvent, such as dry ether, and the solution is subjected to a very low temperature (preferably below $-50°$ C.), whereby the active substance is caused to separate in crystalline form. If desired the crystalline substance may be recrystallized in the cold from ether or the like.

The pure substance is a bright pale yellow and crystallizes at a temperature below $0°$ C. The ultimate analysis and molecular weight determination show that its formula is $C_{16}H_{28}O_2$. It is the lactone of an open chained hydroxy-acid having a double linking between carbon atoms 12 and 13 of the chain as indicated by its oxidation and also by its ozonization. The hydroxy-acid obtained by splitting up the lactone softens at $35°$ C. and melts at about $40°$ C.

The pure hormone is easily soluble in methyl alcohol, ethyl alcohol, ether, petroleum ether or benzene. In methyl alcohol solution it has the optical rotation $(\alpha)_D^{15} = 6° \, 41'$.

It shows the following reactions:—

Carr and Price_____negative
Raspail and Pettenkofer_____positive
Fearon_____negative A chloroform solution yields with sulfuric acid an acetic anhydride a red color, which quickly changes to a permanent brown color.

By treating the substance with thionylchloride and hydrazinehydrate there is obtained a body which crystallizes in fine needles and melts at $104.5°$ C.; this body appears to be a dimolecular hydrazide having an ether bridge. Its formula appears to be $$C_{32}H_{66}O_3N_4.$$ 

The pure substance forms a dibromide from which, by means of zinc dust coated with copper or by means of amalgamated zinc dust, the pure hormone may be recovered.

From the active substance from female internal secretory organs described in United States patent specification No. 1,314,321 and obtainable by purification by vacuum distillation, the substance differs in several respects, among others in its lower content of carbon and its higher content of hydrogen and oxygen and by its optical activity.

The pure hormone in very small doses enlarges considerably the female sexual organs and produces œstrus in castrated animals. It is useful for therapeutical purposes.

The following example illustrates the invention:—

Placenta freed from blood is dried and extracted with benzene or another solvent, for instance alcohol. The solvent is distilled as far as possible and the residue is taken up with acetone. The matter insoluble in acetone is filtered and boiled several times with acetone. The filtrates are all united and the whole acetone solution exposed to cold and then freed from the precipitated and crystallized substances by filtration. The acetone is distilled and the residue taken up with methyl alcohol. This is repeated until the substance dissolves without turbidity in methyl alcohol and also in acetone and in either. Thereupon a methyl alcohol solution of the substance is mixed with an agent that precipitates fatty acids, for example feebly ammoniacal lead acetate in methyl alcohol solution, so long as a precipitate is produced. The filtrate from this precipitate is concentrated in a vacuum and then poured into water. The aqueous liquid is then extracted by shaking repeatedly with petroleum ether. The petroleum ether is then shaken with water for the purpose of separating excess of lead acetate until the water no longer yields a reaction for lead. For the purpose of separating lead soaps soluble in petroleum ether the petroleum ether extract is mixed with a solution of potassium sulfate, silver nitrate or another salt, the action of which forms with the unsaturated fatty acids salts which are insoluble in petroleum ether, the solution is concentrated and after addition of water extracted with petroleum ether. Should the solution still contain traces of lead the solvent is completely expelled in a vacuum, the residue taken up with a little methyl alcohol and the residue containing lead rejected. The petroleum ether solution may also be shaken with Glauber's salts and filtered until it no longer gives a reaction for lead.

The petroleum ether solution freed in this manner from fatty acids may then be worked up in the following manner:—

The petroleum ether solution is evaporated and the residue taken up with absolute ether. The ethereal solution is evaporated to a suitable concentration and then frozen by means of a mixture of carbonic acid snow and ether. The active substance separates in crystals which can be separated from the ethereal mother liquor by decantation or by a suitable filtering device. For the purpose of further purification the hormone thus obtained may be repeatedly dissolved in ether and separated therefrom by freezing. From the mother liquors there is obtained by suitable concentration and freezing further quantities of the substance which constitute pure crystals.

The hormone is somewhat sensitive to oxygen and air, which fact must be borne in mind in isolating it and in using it.

What I claim is:—

1. Process for obtaining female sex hormone from an extract of female sexual organs, which extract has been preliminarily purified by elimination of phosphatides, cholesterin and cholesterin esters and by precipitation of the bulk of fatty acids in form of metal soaps in known manner, the process consisting in dissolving this preliminarily purified extract in petroleum ether, precipitating the remaining residues of metal soaps of unsaturated fatty acids soluble in petroleum ether with a solution of a neutral electrolyte whose anions and kations form with the kations and anions, respectively, of the metal soap salts which are insoluble in petroleum ether, filtering the precipitate, and finally evaporating the petroleum ether solution.

2. Process for obtaining female sex hormone from an extract of female sexual organs, which extract has been preliminarily purified by elimination of phosphatides, cholesterin and cholesterin esters and by precipitation of the bulk of fatty acids in the form of metal soaps in known manner, the process consisting in dissolving this preliminarily purified extract in petroleum ether, precipitating the remaining residues of metal soaps of unsaturated fatty acids soluble in petroleum ether with a solution of a neutral electrolyte whose anions and kations form with the kations and anions, respectively, of the metal soap salts which are insoluble in petroleum ether, filtering the precipitate, evaporating the petroleum ether solution, and subjecting the hormone thus obtained in highly concentrated form to a further purification by dissolving the hormone in ether and cooling the solution to a temperature below $-50°$ C., whereby the hormone separates in crystalline form.

In witness whereof I have hereunto signed my name this 19th day of May, 1928.

SIGMUND FRAENKEL.